US010657411B1

(12) United States Patent
Manyam et al.

(10) Patent No.: US 10,657,411 B1
(45) Date of Patent: May 19, 2020

(54) ITEM IDENTIFICATION

(71) Applicant: Amazon Technologies, Inc., Reno, NV (US)

(72) Inventors: Ohil Krishnamurthy Manyam, Bellevue, WA (US); Minmin Chen, San Jose, CA (US); Liefeng Bo, Seattle, WA (US); Xiaofeng Ren, Yarrow Point, WA (US); Dilip Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/225,240

(22) Filed: Mar. 25, 2014

(51) Int. Cl.
*G06K 9/62* (2006.01)

(52) U.S. Cl.
CPC .................. *G06K 9/6215* (2013.01)

(58) Field of Classification Search
CPC ............... G06K 9/6215; G06K 9/623
USPC .......................... 382/224; 700/218
See application file for complete search history.

(56) References Cited

U.S. PATENT DOCUMENTS

| 5,930,771 | A | * | 7/1999 | Stapp | .................. | G06Q 10/087 |
| | | | | | | 705/26.5 |
| 6,041,274 | A | | 3/2000 | Onishi et al. | | |
| 6,462,663 | B1 | | 10/2002 | Wilson et al. | | |
| 6,796,799 | B1 | | 9/2004 | Yoshiike et al. | | |
| 7,092,789 | B2 | | 8/2006 | Chavez et al. | | |
| 7,225,980 | B2 | | 6/2007 | Ku et al. | | |
| 7,416,117 | B1 | | 8/2008 | Morrison | | |
| 7,774,243 | B1 | | 8/2010 | Antony | | |
| 7,949,568 | B2 | * | 5/2011 | Fano | ........................ | G06K 9/00 |
| | | | | | | 356/4.03 |
| 8,009,864 | B2 | | 8/2011 | Linaker et al. | | |

(Continued)

FOREIGN PATENT DOCUMENTS

| CN | 201965010 U | 9/2011 |
| CN | 202052709 U | 11/2011 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Samir A Ahmed
(74) *Attorney, Agent, or Firm* — Athorus, PLLC

(57) ABSTRACT

This disclosure describes a system for utilizing multiple image processing techniques to identify an item represented in an image. In some implementations, one or more image processing algorithms may be utilized to process a received image to generate item image information and compare the item image information with stored item image information to identify the item. When a similarity score identifying the similarity between the item image information and at least one of the stored item image information is returned, a determination may be made as to whether the similarity score is high enough to confidently identify the item. If it is determined that the similarity score is high enough to confidently identify the item, the other algorithms may be terminated and the determined identity of the item returned.

22 Claims, 9 Drawing Sheets

(56) References Cited

U.S. PATENT DOCUMENTS

| | | | |
|---|---|---|---|
| 8,091,782 B2* | 1/2012 | Cato | G06Q 10/087 235/385 |
| 8,117,071 B1 | 2/2012 | Fitch et al. | |
| 8,175,925 B1* | 5/2012 | Rouaix | G06Q 20/203 705/22 |
| 8,189,855 B2 | 5/2012 | Opalach et al. | |
| 8,380,347 B2* | 2/2013 | Garson | G07F 9/026 700/236 |
| 8,423,431 B1 | 4/2013 | Rouaix et al. | |
| 8,630,924 B2 | 1/2014 | Groenevelt et al. | |
| 8,680,991 B2 | 3/2014 | Tran | |
| 8,688,598 B1 | 4/2014 | Shakes et al. | |
| 8,897,485 B2 | 11/2014 | Fedorovskaya et al. | |
| 9,158,115 B1 | 10/2015 | Worley et al. | |
| 9,165,318 B1 | 10/2015 | Pauley et al. | |
| 9,216,857 B1 | 12/2015 | Kalyan et al. | |
| 9,311,789 B1 | 4/2016 | Gwin | |
| 9,473,747 B2 | 10/2016 | Kobres et al. | |
| 2003/0002712 A1 | 1/2003 | Steenburgh et al. | |
| 2003/0154141 A1* | 8/2003 | Capazario | G06Q 10/087 705/26.1 |
| 2004/0181467 A1 | 9/2004 | Raiyani et al. | |
| 2005/0027603 A1 | 2/2005 | Green | |
| 2005/0067816 A1 | 3/2005 | Buckman | |
| 2005/0077352 A1 | 4/2005 | Gudbjartsson | |
| 2005/0171854 A1 | 8/2005 | Lyon | |
| 2006/0001545 A1 | 1/2006 | Wolf | |
| 2006/0139166 A1 | 6/2006 | Choutier et al. | |
| 2006/0195050 A1 | 8/2006 | Alwan et al. | |
| 2006/0259195 A1* | 11/2006 | Eliuk | A61J 1/20 700/245 |
| 2007/0276270 A1 | 11/2007 | Tran | |
| 2008/0018738 A1 | 1/2008 | Lipton et al. | |
| 2008/0055087 A1 | 3/2008 | Horii et al. | |
| 2008/0077511 A1* | 3/2008 | Zimmerman | G06Q 10/00 705/28 |
| 2008/0103939 A1* | 5/2008 | Gibb | G07F 11/002 705/28 |
| 2008/0106870 A1 | 5/2008 | Dully | |
| 2008/0109114 A1 | 5/2008 | Oita et al. | |
| 2008/0129518 A1 | 6/2008 | Carlton-Foss | |
| 2008/0186189 A1 | 8/2008 | Azzaro et al. | |
| 2009/0072029 A1* | 3/2009 | Martin | G06Q 10/087 235/385 |
| 2009/0121017 A1* | 5/2009 | Cato | G06Q 10/087 235/385 |
| 2009/0179734 A1 | 7/2009 | Do et al. | |
| 2009/0224925 A1 | 9/2009 | Gannot et al. | |
| 2009/0245573 A1 | 10/2009 | Saptharishi et al. | |
| 2009/0254003 A1 | 10/2009 | Buckman | |
| 2009/0259571 A1 | 10/2009 | Ebling et al. | |
| 2009/0287449 A1 | 11/2009 | Nagashima | |
| 2009/0322540 A1 | 12/2009 | Richardson et al. | |
| 2009/0322548 A1 | 12/2009 | Gottlieb | |
| 2010/0172052 A1 | 7/2010 | Shibata | |
| 2011/0011936 A1 | 1/2011 | Morandi et al. | |
| 2011/0178863 A1 | 7/2011 | Daigle | |
| 2011/0230791 A1 | 9/2011 | Kate et al. | |
| 2011/0295412 A1 | 12/2011 | Hara et al. | |
| 2012/0019643 A1 | 1/2012 | Gideon et al. | |
| 2012/0055982 A1 | 3/2012 | Edwards | |
| 2012/0101770 A1 | 4/2012 | Grabiner et al. | |
| 2012/0123277 A1 | 5/2012 | Blaha et al. | |
| 2012/0235860 A1 | 9/2012 | Ghazarian | |
| 2012/0262294 A1 | 10/2012 | Nikolovski | |
| 2012/0284132 A1 | 11/2012 | Kim et al. | |
| 2012/0314901 A1 | 12/2012 | Hanson et al. | |
| 2013/0000228 A1 | 1/2013 | Ovaert | |
| 2013/0076898 A1 | 3/2013 | Philippe et al. | |
| 2013/0100284 A1 | 4/2013 | Fujii et al. | |
| 2013/0138395 A1 | 5/2013 | Baggen et al. | |
| 2013/0217352 A1 | 8/2013 | Pan et al. | |
| 2013/0223673 A1 | 8/2013 | Davis et al. | |
| 2013/0253700 A1 | 9/2013 | Carson et al. | |
| 2013/0285813 A1 | 10/2013 | Kasama | |
| 2014/0031972 A1 | 1/2014 | DeWitt et al. | |
| 2014/0052555 A1 | 2/2014 | MacIntosh | |
| 2014/0104059 A1 | 4/2014 | Tran | |
| 2014/0164176 A1 | 6/2014 | Kitlyar | |
| 2014/0191863 A1 | 7/2014 | Kate | |
| 2014/0244429 A1 | 8/2014 | Clayton et al. | |
| 2014/0244447 A1 | 8/2014 | Kim et al. | |
| 2014/0244488 A1 | 8/2014 | Kim et al. | |
| 2014/0253429 A1 | 9/2014 | Dai et al. | |
| 2014/0266684 A1 | 9/2014 | Poder et al. | |
| 2014/0276242 A1 | 9/2014 | Chen et al. | |
| 2014/0279294 A1 | 9/2014 | Field-Darragh et al. | |
| 2014/0279713 A1 | 9/2014 | Calman et al. | |
| 2014/0288714 A1 | 9/2014 | Poivet | |
| 2014/0304072 A1 | 10/2014 | Rider et al. | |
| 2014/0313036 A1 | 10/2014 | Sweeney et al. | |
| 2014/0347511 A1 | 11/2014 | Rodriguez-Serrano et al. | |
| 2015/0002292 A1 | 1/2015 | Cavalcanti et al. | |
| 2015/0006319 A1 | 1/2015 | Thomas et al. | |
| 2015/0012426 A1 | 1/2015 | Purves et al. | |
| 2015/0019391 A1 | 1/2015 | Kumar et al. | |
| 2015/0033246 A1 | 1/2015 | Gideon et al. | |
| 2015/0068069 A1 | 3/2015 | Tran et al. | |
| 2015/0073907 A1 | 3/2015 | Purves et al. | |
| 2015/0074615 A1 | 3/2015 | Han et al. | |
| 2015/0302720 A1 | 10/2015 | Zhang et al. | |
| 2015/0317890 A1 | 11/2015 | Kate | |
| 2016/0028825 A1 | 1/2016 | Corbin | |
| 2016/0038061 A1 | 2/2016 | Kechichian et al. | |
| 2016/0113551 A1 | 4/2016 | Annegam et al. | |

FOREIGN PATENT DOCUMENTS

| | | |
|---|---|---|
| CN | 102328870 A | 1/2012 |
| CN | 203015121 U | 6/2013 |
| DE | 1616196 A1 | 3/1971 |
| EP | 1616196 A2 | 1/2006 |
| JP | 2004001907 A | 1/2004 |
| JP | 2006228024 A | 8/2006 |
| JP | 2011156099 A | 8/2011 |
| KR | 101228300 B1 | 2/2013 |
| WO | 2004092744 A2 | 10/2004 |
| WO | 2011124732 A2 | 10/2011 |
| WO | 2015028283 A1 | 3/2015 |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

Estudillo-Valerrama et al., "Design and Implementation of Distributed Fall Detection System—Personal Server", Nov. 2009, IEEE Transactions on Information Technology in Biomedicine, vol. 13 No. 6, pp. 874-881.

* cited by examiner

ITEM IDENTIFICATION

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, etc. Many of those physical stores also maintain inventory in a storage area or fulfillment center that can be used to replenish inventory located in the shopping areas and/or to satisfy orders for items that are placed through other channels (e.g., e-commerce). Other examples of entities that maintain inventory include libraries, museums, rental centers and the like. In each instance, for an item to be moved from one location to another, it is picked from its current location and transitioned to a new location. It is often desirable to track the transition of inventory and/or the location of inventory.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
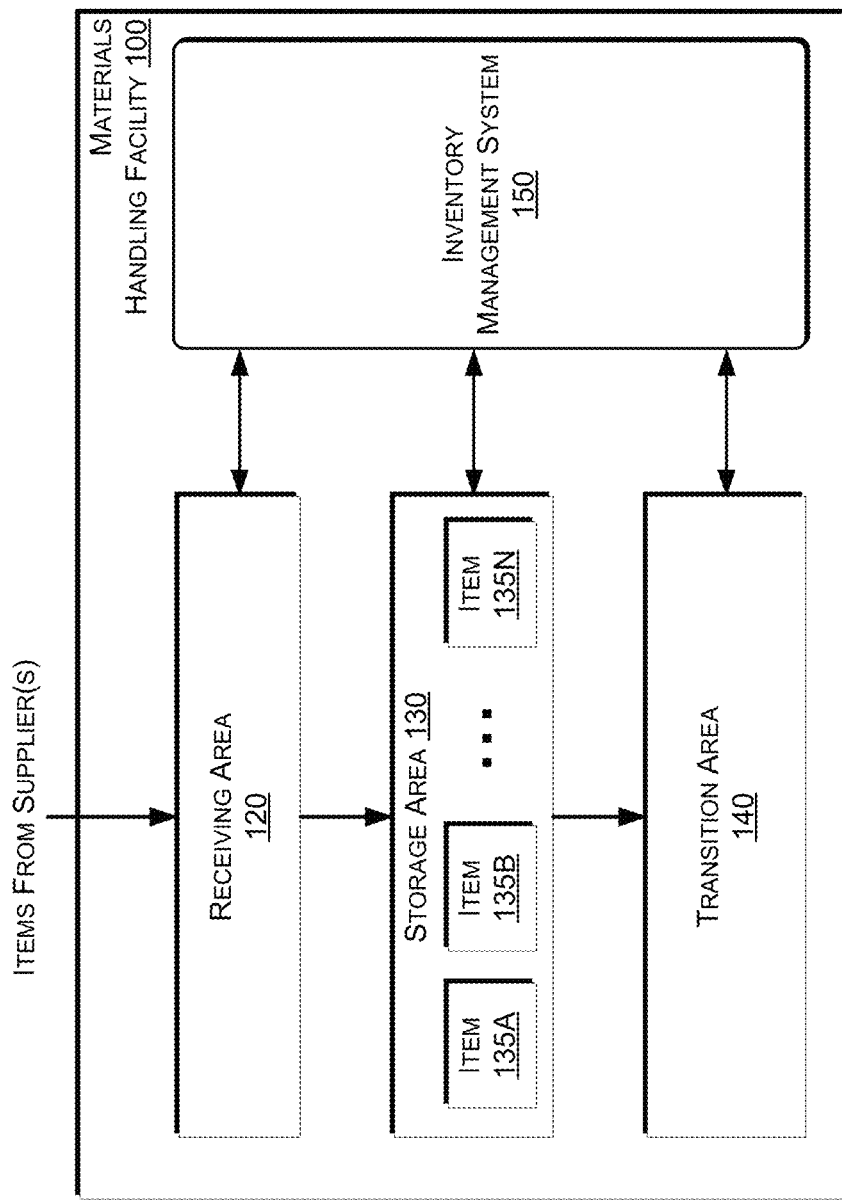
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system for processing an image of an item and correctly identifying the item from a group of candidate items. In one implementation, as item image information for a new item is added to an item images data store, a determination is made as to the weight of the item represented by the image, and the item may be associated with a weight class. Each weight class represents items within a defined weight range. Item image information for items in the same weight class may then be used when new items are added to inventory and/or when identifying an item represented in an image.

When an image of an item is received, the weight of the item is also determined and used to identify a weight class for use in processing the image to identify the item. As discussed below, the weight of the item may be determined through use of, for example, load cells, pressure sensors, scales, etc. (generally referred to herein as "weight determining elements"). For example, each shelf within an inventory location may include a pressure sensor that can detect weight changes. When an item is picked from the inventory area, the pressure sensor will determine a decrease in weight at the inventory location. That decrease in weight is representative of the weight of the picked item. Likewise, when an item is placed at an inventory location, the pressure sensor will detect an increase in weight. That increase in weight is representative of the weight of the placed item.

Similar techniques for determining the weight of items may be utilized at other locations. For example, weight changes representative of items may be determined using weight determining elements in a tote that is carried or pushed by a user into which the user may place items and/or remove items. Likewise, weight determining elements may be included in the floor or other base surface of the materials handling facility and used to determine changes in weight when a user picks and/or places an item.

Based on the weight of the item, a corresponding weight class is identified and stored item image information representative of items associated with the determined weight class may be used to process the image and identify the item. By comparing item image information of the received image with only stored item image information for items having a similar weight, the processing time is reduced and the accuracy of item identification is increased.

In some implementations, multiple image processing techniques may be utilized either independently or together to identify the item. For example, any one of an image matching ("IM") algorithm, an edge detection algorithm, an object detection algorithm, a common feature suppression ("CFS") algorithm, a hierarchical matching pursuit ("HMP") algorithm, a deep learning ("DL") algorithm, and/or other similar algorithms may be utilized to process the received image to generate item image information and compare the item image information with stored item image information to identify the item. In some implementations, multiple algorithms may be initiated at approximately the same time.

The IM algorithm may be used to process the image of the item and compare features of the image with stored item information representative of a stored image. The CFS algorithm, may identify common features between a received item and a stored image, remove those common features and then determine a similarity between the remaining features. The HMP algorithm builds a feature hierarchy, layer by layer, for the received image and those feature sets may be compared with stored item information. As will be appreciated, the algorithms discussed herein are merely exemplary and fewer, additional or other algorithms may also be utilized.

When a similarity score identifying the similarity between the item image information and at least one of the stored item image information is returned, a determination may be made as to whether the similarity score is high enough to confidently identify the item. If it is determined that the similarity score is high enough to confidently identify the item, the other algorithms may be terminated and the determined identity of the item returned.

If the similarity score is not high enough to confidently identify the item, the other algorithms may continue and the process may repeat as each algorithm completes and returns a similarity score. In some implementations, the similarity scores may be aggregated to identify the item. In other implementations, only the highest similarity score may be utilized to identify the item.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130 and transition area 140. Any one or more of the receiving area 120, storage area 130 and/or transition area 140 may include weight determining elements configured to determine weights of objects picked from or placed at a location. Likewise, in some implementations, one or more portions of the receiving area 120, storage area 130 or transition area 140 may include inventory locations configured with weight determining elements capable of detecting the weight of objects on or in the inventory location. For example, if the inventory location is a shelf, the shelf may include one or more weight determining elements configured to detect the presence and/or weight of objects located on the shelf. Weight determining elements may be any one or a combination of sensors. For example, the weight determining element may include weight sensors, pressure sensors, load cells, and/or Interpolating Force-Sensitive Resistance ("IFSR") sensors.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location, weight or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms (generally referred to herein as "inventory locations"), such that all items 135 of a given kind are stored in one inventory location. In other implementations, like items 135 may be stored in different inventory locations. For example, to optimize retrieval of certain items 135 having high turnover within a large physical facility, those items 135 may be stored in several different inventory locations to reduce congestion that might occur at a single point of storage. An inventory location may include any area where one or more items may be stored. For example, an inventory location may be a bin, shelf, container, tote, etc.

When a customer order specifying one or more items 135 is received, or as a user progresses through the materials handling facility 100, the corresponding items 135 may be selected or "picked" from inventory locations. In various implementations, item picking may range from manual to completely automated picking. For example, in one implementation, a user may have a list of items they desire and may progress through the materials handling facility picking items 135 from inventory locations within the storage area 130 and placing those items 135 into a tote. In other implementations, materials handling facility employees (also users) may pick items 135 using written or electronic pick lists derived from orders and place picked items into a tote as the user progresses through the materials handling facility 100.

As discussed in more detail below, as items are picked, the inventory location weight will decrease as a result of the item picking. Likewise, if an item is placed at an inventory location, the inventory location weight will increase as a result of the placement. As items are picked and/or placed at inventory locations, the item identifier list associated with the user that picked and/or placed the item is updated.

Figure 2:
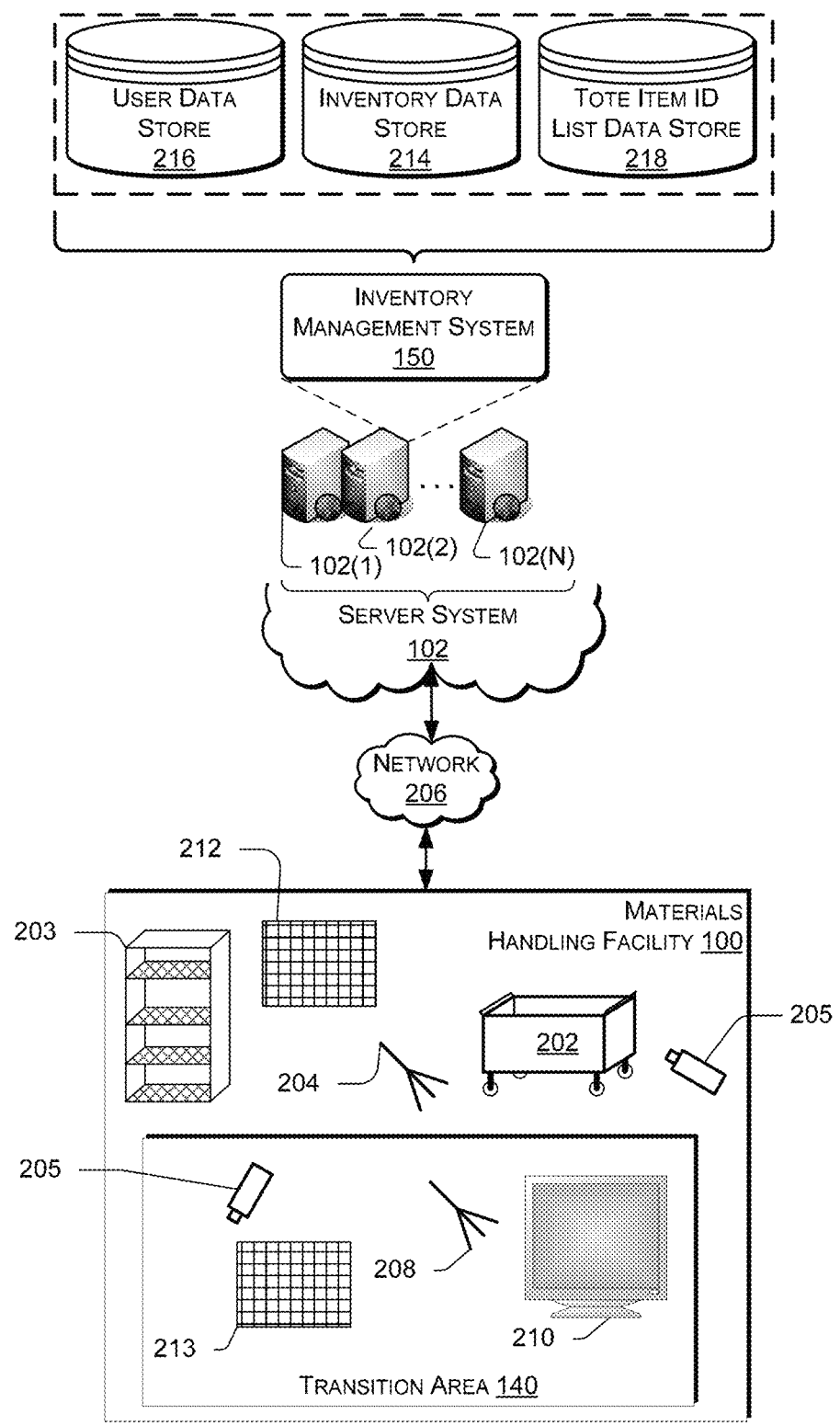
FIG. 2 is a block diagram illustrating additional details of a materials handling facility, according to some implementations.

To further illustrate, FIG. 2 is a block diagram of additional details of a materials handling facility 100, according to some implementations. A materials handling facility agent, user, or other individual may utilize a tote 202 to progress through a materials handling facility 100 and pick items 135 from storage areas 130. Different surface areas, such as base surface, inventory location 203, tote 202, and transition area surface, may include one or more weight determining elements 212, 213 for detecting the weight of items that are picked and/or placed within the materials handling facility. For example, a user may pick an item from a shelf of an inventory location and place the item into the tote that is in use by the user. Likewise, one or more image capture devices 205 (e.g., camera) may be positioned within the materials handling facility and configured to capture images of the user and/or items within the materials handling facility. For example, one or more image capture devices may be positioned on or inside of different inventory locations and positioned to capture images of items positioned at different inventory locations. Likewise, additional image capture elements 205 may be positioned to capture images of users as they pick and/or place items at an inventory location, capture images of items as they are picked and/or placed at the inventory location and/or capture images of items as they are picked and/or placed into a tote.

When an item is picked and/or placed from a location within the materials handling facility 100, an image of the item is obtained by one or more image capture devices 205 and provided to the inventory management system 150 for use in identifying the item. For example, as a user picks an item from an inventory location, an image of the item as it is picked may be obtained and provided to the inventory management system 150 for processing. Alternatively, an image of the item just before it was picked may be identified and provided to the inventory management system 150. For example, images of items positioned at inventory locations may be captured while the item is stationary at the inventory location and associated with that inventory location. In response to a decrease in weight from a pick of the item, the inventory location is identified and the image of the item captured while the item was stationary may be provided to the inventory management system 150 for processing. In a similar manner, if a weight change at an inventory location is detected, resulting from an item place, an image of the item now positioned at the inventory location may be captured and provided to the inventory management system for processing.

When a user arrives at the materials handling facility 100 and optionally selects a tote, a user pattern is established and a total weight determined for the user pattern. The weight determining elements may be calibrated so that the total weight associated with the user pattern can be comparatively measured at different areas within the materials handling facility. For example, the weight determining elements at the location where the user arrives at the materials handling facility and the weight determining elements at each transition point may be calibrated so that the total weight associated with the user pattern is consistently measured. Likewise, the weight determining elements of the inventory locations and/or the totes may be calibrated. In some implementations, when the user arrives and/or proceeds through a transition area, the user may momentarily remain stationary so a total weight can be determined without the need to factor out measured weight resulting from the movement of the user and/or companion.

As items 135 are picked or placed at inventory locations 203, the change in weight at the inventory location and change in the total weight associated with the user pattern corresponding to the user that picked/placed the item may be determined. In some implementatations, the item may include an identifier, such as an active identifier (e.g., radio frequency identifier ("RFID")) or visual identifer (e.g., barcode, QR code, unique number, shape, etc.). Item identifier readers may be positioned throughout the materials handling facility, such as on or in the inventory locations, overhead, etc., and configured to detect the item identifiers of items as they are placed and/or removed from inventory locations. Generally, the item identifier reader may utilize one or more wireless technologies (e.g., RFID, near field communication ("NFC"), Bluetooth, infrared) and/or visual technologies (e.g., camera, image processing, object recognition, stereoscopic imagery) to detect items and/or item identifiers.

In other implementations, the location of each inventory item may be known and, when the item action of item removal is detected, the location of the item action is determined and the item associated with that location identified. In addition, or as an alternative, the weight, size and/or shape of the item as detected by the sensors may be used to identify the item and/or identify a weight class of candidate items. For example, based on a weight change detected by a weight determining element, a weight class representative of items having a similar weight to the detected weight may be identified. An image of the item that was picked or placed that caused the weight change may then be compared with stored item image information representative of each item in the weight class. The stored item image information with a highest similarity score to the item information from the received image may be used to identify the item that was picked or placed.

When an item is identified, the inventory management system may associate an item identifier representative of the item with an item identifier list corresponding to the user that removed and/or placed the item at the inventory location. This item identifier list may be maintained in a memory located on the tote 202 or maintained by the inventory management system 150, such as in the item identifier list data store 218.

In some instances, the tote 202 may operate in conjunction with or may otherwise utilize or communicate with one or more components of the inventory management system 150. The tote 202 may include one or more weight determining elements and detect increases and/or decreases in weight within the tote. For example, when a user picks an item from an inventory location and places the item into the tote 202, the tote may detect the increase in weight and communicate that information to the inventory management system 150. Likewise, components of the inventory management system 150 may interact and communicate with the tote 202 as well as identify user patterns, positions of user patterns and/or communicate with other components of the materials handling facility 100.

Generally, the inventory management system 150 may include one or more communication devices, such as wireless antennas 204, that facilitate wireless communication (e.g., Wi-Fi, NFC, Bluetooth) between the inventory management system 150, the tote 202, image capture devices 205, weight determining elements 203, 212, 213 and/or a user. The inventory management system 150 may also include one or more server systems 102 that may be local to the materials handling facility 100, remote from the materials handling facility 100, or any combination thereof.

The inventory management system 150 may utilize antennas 204 within the materials handling facility 100 to create a local wireless network (e.g., Wi-Fi) so that the image capture devices 205, tote 202 and/or the weight determining elements 203, 212, 213 can connect to and communicate with the inventory management system 150. Likewise, in instances when one or more of the components of the inventory management system 150 are remote from the materials handling facility 100, they may communicate with other components of the inventory management system 150 via a network 206.

In some implementations, the user may be identified and/or identify themself when they arrive at the materials handling facility 100. For example, the user may provide a user identifier or other identifying information to identify themself. Alternatively, or in addition thereto, one or more images may be captured of the user and processed for facial recognition to identify the user. In still other implementations, one or more biometrics (e.g., fingerprint, eye scan) may be received for use in identifying the user.

Once identified, a user pattern may be established for the user and associated with the user and/or the user's portable device. The user pattern may include an identification of the size and shape of contacts between objects (e.g., user(s), companion(s) with the user, item(s), tote(s)) associated with the user pattern, etc. The total weight associated with the user pattern may include the weight of the user, the tote, picked items, and/or any companions (other people, pets, etc.) with the user. The tote 202 may also be associated with the user pattern. The user pattern may also include and/or be associated with an item identifier list that is updated each time a user and/or companion with the user removes an item from an inventory location (item identifier list is updated to include the item identifier) or places an item at an inventory location (item identifier list is updated to remove the item identifier).

When the user enters a transition area 140 or progresses through a transition area 140, the items associated with the user pattern may be transitioned from the materials handling facility to the user, transitioned from the materials handling facility to a carrier, transitioned from one location (e.g., storage) within the materials handling facility 100 to another location (e.g., packing) within the materials handling facility 100, etc.

After transition, when the user leaves the tote 202, such as at the end of a work day, the association between the tote 202 and the user may be removed so that the tote 202 can be associated with another user when he/she arrives at the materials handling facility 100.

Generally, the inventory management system 150 may include any number and combination of input components, output components and server system 102. The input components may include imaging devices 205, microphones, weight determining elements 203, 212, 213, antennas 204, 208, or any other component that is capable of receiving input about its surrounding environment. The output components may include projectors, displays 210, antennas 204, 208, speakers and/or any other component that is capable of providing output to its surrounding environment.

The inventory management system 150 may also include a server system 102. The server system 102 may be local to the materials handling facility, remote from the materials handling facility, or any combination thereof. Likewise, the server system 102 may be configured to communicate over a network 206 with the input components, output components and/or directly with the user.

As illustrated, the server system 102 may be remote from the materials handling facility and implemented as one or more servers 102(1), 102(2), . . . , 102(N) and may, in some instances form a portion of a network-accessible computing platform implemented as a computing infrastructure of processors, storage, software, data access, and so forth that is maintained and accessible by components/devices of the inventory management system 150 via a network 206 such as the Internet. The server system 102 does not require end-user knowledge of the physical location and configuration of the system that delivers the services. Common expressions associated with the remote server system 102 include "on-demand computing," "software as a service (SaaS)," "platform computing," "network-accessible platform," "cloud services," "data centers" and so forth.

The network 206 may utilize wired technologies (e.g., wires, USB, fiber optic cable, etc.), wireless technologies (e.g., RF, IR, NFC, cellular, satellite, Bluetooth, etc.), or other connection technologies. The network 206 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The server system 102 may also include an inventory data store 214, a user data store 216, and an item identifier data store 218. The data stores may include lists, arrays, databases, and other data structures used to provide storage and retrieval of data. Likewise, while the disclosure describes multiple data stores, in some implementations, the data stores may be configured as a single data store or multiple data stores.

The inventory data store 214 maintains item information about items 135 stored in the storage areas 130 of the materials handling facility 100. For example, the inventory data store 214 may store for each item the item weight, associated weight class, dimensions, color, expiration date, volume, manufacturer, identifier (e.g., universal product identifier), quantity of items in the storage area, description of the item, etc.

The user data store 216 includes information about users, such as materials handling facility employees, customers, companions, etc. Any type of information may be stored in the user data store 216. For example, user profile information, such as attributes, name, address, gender, weight, purchase history, social networks and/or friends with which the user interacts, past user patterns associated with the user, determined step distances, cadence, gait and the like may be stored in the user profile data store 216. User profile information may be provided directly by users, such as when they become employed, collected from users when interacting with the inventory management system 150, etc.

The item identifier list data store 218 may include item identifier lists associated with user patterns within the materials handling facility 100. Likewise, the item identifier list data store 218 may include information about each user pattern, such as a unique identifier, the total weight associated with the user pattern, size/shape of contacts included in the user pattern, tote identifier for the tote associated with the user pattern, companions of the user, etc.

The inventory data store 214, user data store 216, and item information list data store 218 may be integrated with the server system 102 or otherwise communicatively coupled with the server system 102. For example, one or more of the inventory data store 214, user data store 216, and item identifier list data store 218 may be located at a remote computing resource (not shown) and communicatively coupled with the server system 102. In some implementations, the inventory data store 214, user data store 216, and item identifier list data store 218 may include one or more CD-RW/DVD-RW drives, hard disk drives, solid-state drives, tape drives, or other storage devices that are utilized to store digital content and information. The server system 102, separately or together with the inventory data store 214, user data store 216 and item identifier list data store 218 may provide an inventory management system 150.

The organization and operation of the materials handling facility 100 described above is given as an example. In other implementations, a materials handling facility 100 may be arranged differently and operate differently than described above. For example, some implementations of materials handling facility 100 may not have a dedicated receiving area 120. In such implementations, received items may be placed directly into the storage area 130. In general, the materials handling facility 100 may employ any organization and operational flow for handling inventory.

Figure 3:
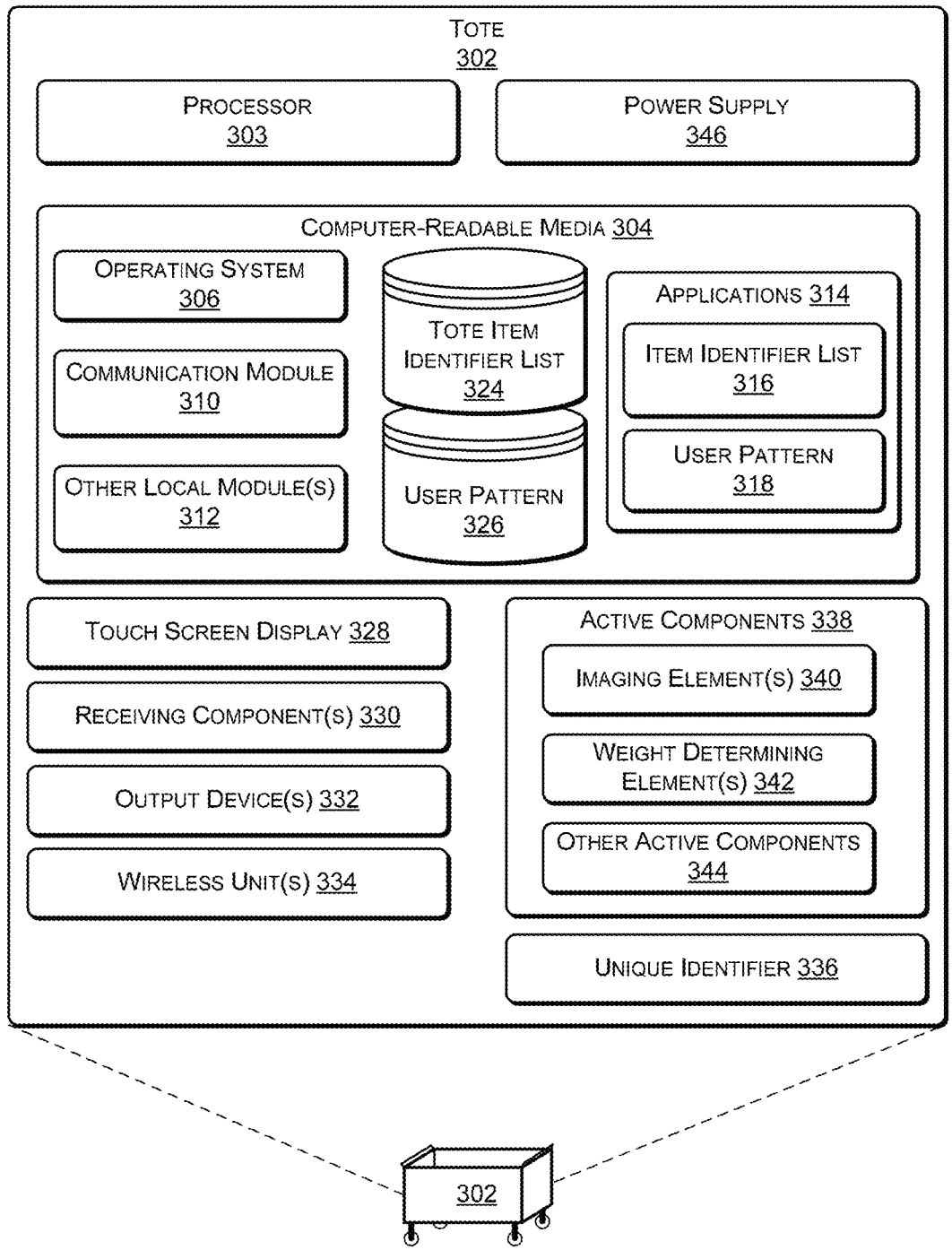
FIG. 3 is a block diagram of a tote, according to some implementations.

FIG. 3 illustrates example functional components of a tote 302, according to some implementations. The functional components of the tote 302 include one or more processors 303 and computer-readable media 304. The computer-readable media 304 may include volatile and nonvolatile memory, removable and non-removable media implemented in any method or technology for storage of information, such as computer-readable instructions, data structures, program modules, item information lists, user profiles, user patterns, or other data. Such memory includes, but is not limited to, RAM, ROM, EEPROM, flash memory or other memory technology. The computer-readable media 304 may be implemented as computer-readable storage media ("CRSM"), which may be any available physical media accessible by the processor(s) 303 to execute instructions stored on the media 304. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 303.

Several modules such as instruction, data stores, and so forth may be stored within the computer-readable media 304 and configured to execute on the processor(s) 303. A few example functional modules are shown stored in the computer-readable media 304, although the same functionality may alternatively be implemented in hardware, firmware, or as a system on a chip (SOC).

An operating system module 306 may be configured to manage hardware and services within and coupled to the tote 302 for the benefit of other modules. A communication module 310 facilitates communication, such as cellular communication, RF communication, Wi-Fi communication, Bluetooth communication, NFC, satellite-based communication, and so forth. For example, the communication module 310 may facilitate communication with the inventory management system 150 via the network 206 or over another wireless communication path and/or may facilitate communication with the sensors via the network 206 or over another wireless communication path. Likewise, the communication module 310 may facilitate communication and detection of item identifiers. Other local modules 312 may also be present on the tote 302, depending upon the implementation and configuration of the tote 302.

The tote 302 may also include a plurality of applications 314 stored in the computer-readable media 304 or otherwise accessible to the tote 302. In this implementation, the applications 314 include an item identifier list application 316 and user pattern application 318. However, the tote 302 may include any number or type of applications and is not limited to the specific example shown here. The item identifier list 316 application may facilitate identification and/or tracking of item identifiers as they are picked by the user, placed into the tote, or picked from the tote and placed by the user at an inventory location. The user pattern 318 application may maintain information about the user pattern, such as the total weight, contact information, etc. Data stores may also be stored locally on the media 304, including an item identifier list data store 324 and one or more user patterns 326. The item identifier list data store 324 may include a list of item identifiers that have been detected and associated with the user pattern. The user pattern data store 326 may include user identifier(s), step distances, contact information (e.g., size, shape), total weight associated with the user pattern, and other information associated with a user pattern.

The tote 302 may also include a display, such as a touch screen display 328, as well as other input devices, like a keypad, control buttons, microphones, motion detection components, etc. Output devices 332 may include a display, an illumination element (e.g., LED), a vibrator to create haptic sensations, speaker(s) or the like. Likewise, the tote 302 might include a wireless unit 334 coupled to another antenna to facilitate a wireless connection to one or more networks, such as the network 206 and/or the sensors. The wireless unit 334 may implement one or more of various wireless technologies, such as Wi-Fi, Bluetooth, RF, NFC and the like.

The tote 302 may also include an embedded unique identifier 336. The unique identifier may be embedded into a memory 304 of the tote 302 or otherwise stored and accessible by the tote 302.

The tote 302 may also be equipped with multiple active components 338. Any number of components may be used. Representative components include imaging elements 340, weight determining elements 342 and other active components 344. For example, the weight determining elements 342 may be load sensors, IFSR sensors, pressure sensors, scales, etc., that are used to detect increases and/or decreases in weight as items are placed into and/or picked from the tote. The tote 302 may also include some form of power supply 346, such as a battery, solar power, or other form of power supply for providing power to the tote 302 and its components during operation. In some implementations, rather than using weight determining elements included in the base surface of the materials handling facility for detecting increases in weight of the user pattern, the tote 302 may include one or more weight determining elements that detect an increase and/or decrease in weight as items are placed into or picked from the tote 302. In other implementations, sensors may be utilized in both the base surface and the tote.

While the functional components of the example tote 302 are discussed herein as part of the tote 302, in other implementations, one or more of the functional components may be distributed throughout the materials handling facility 100 and/or implemented as part of the inventory management system 150. For example, one or more of the applications, such as the item identifier application 316, may be implemented as part of the inventory management system 150. Likewise, the item identifier list 324 may be maintained in the computer-readable media 304 of the tote 302 and/or in the item identifier list data store 218 of the inventory management system 150.

Figure 4:
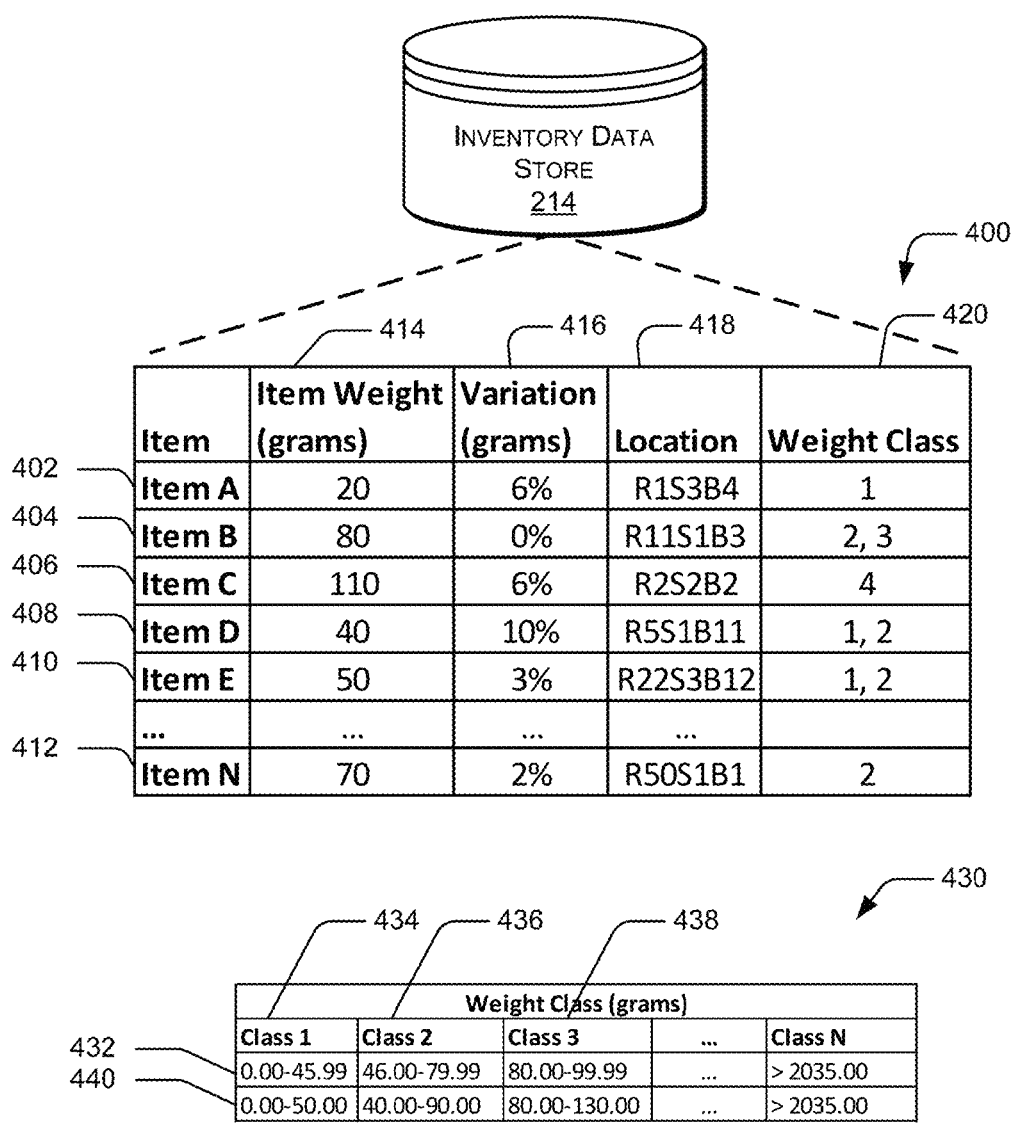
FIG. 4 is a block diagram illustrating an example data structure, according to some implementations.

FIG. 4 is a block diagram illustrating an example data structure 400 maintained in the inventory data store 214, according to some implementations. The example data structure maintains item information for a plurality of items 402, 404, 406, 408, 410, 412 located within the materials handling facility. The item information may include, for example, the item weight 414 associated with the item, weight variations 416 for each item, item locations 418 for each item and weight classes 420 associated with each item. Item weight may be determined based on a measured and/or provided weight for the item. For example, as items are received into the materials handling facility, placed at inventory locations, picked from inventory locations and/or otherwise handled, the weight for each respective item may be determined. The weight associated with the item information may be assigned as the mean, median or other weight selected based on the measured weights of those items. For example, the weight for Item A is 20 grams. Twenty grams may be assigned to the item based on a recorded weight of one or more of the items. Alternatively, the weight may be assigned based on item information received from a manufacturer or supplier of the item and/or input by an agent or user within the materials handling facility.

Some items, even though they are the same type, may vary in weight with respect to other items of the same type. Accordingly, the variation 416 represents the variation in weight from the associated item weight 414. In some implementations, the variation may be initially set to a defined amount (e.g., 6%) when a new item is added to the inventory data store 214. In other implementations, the variation 416 may be updated based on differences in measured weights of the items. For example, even though the variation 416 for Item B 404 was initially set to 6%, all weight measurements for the item have been 80 grams. Accordingly, the variation 416 for Item B has been updated so that there is no variation. In comparison, Item D items have measured with a variance of up to 10% from the item weight 414 and accordingly the item variation 416 has been updated. Updating the weight variation is discussed in further detail below with respect to FIG. 7. In some implementations, the variation may be based on a Gaussian distribution model, standard deviation or other model for representing variation around a defined weight for an item.

The data structure 400 may also maintain location information 418 for items. In some implementations, all items of a same item type may be maintained in the same inventory area and thus only a single location 418 may be maintained for the item. In another example, items of the same item type may be maintained at multiple locations. In such an example, each of the locations for an item type may be maintained in the data structure 400.

Finally, a weight class 420 may be associated with each item and maintained by the data structure 400. As discussed below, weight classes may be established and used to reduce the candidate items that are considered when identifying an item. Weight classes 420 may be any defined range of weights and/or based on a number of items weighing different amounts. For example, every ten items may be associated with a different weight class 420 and a new weight class 420 established until all items have been associated with the weight class. For example, if there are 100 items and each item is a different weight, ten weight classes would be established, each weight class associated with ten items.

Alternatively, as illustrated in the table 430, the weight classes may be defined weight ranges. The weight ranges may be adjacent weight ranges, as illustrated by the weight class ranges 432. For example, weight Class 1 434 may be associated with items weighing between 0.00 and 45.99 grams. Weight Class 2 436 may be associated with items weighing between 46.00 and 79.99 grams. Weight Class 3 438 may be associated with items weighing between 80.00 and 99.99 grams. There may be any number and range of weight classes.

For overlapping weight classes, as illustrated by weight classes 440, the weight ranges may overlap, as illustrated by the weight class ranges 434. For example, weight Class 1 434 may be associated with items weighing between 0.00 and 50.00 grams. Weight Class 2 436 may be associated with items weighing between 40.00 and 90.00 grams. Weight Class 3 438 may be associated with items weighing between 80.00 and 130.00 grams. There may be any number and range of weight classes and the amount of overlap may be the same or different between weight classes.

Items may be assigned to more than one weight class, as illustrated by the data structure 400. For example, due to the weight variation 416, the potential measured weight of an item may fall into two different weight classes. In such an instance, the item is associated with both weight classes. Likewise, for weight classes with overlapping weight ranges, an item weight, or weight variation, may be within the overlap weight ranges of two weight classes. In such an instance, the item is associated with both weight classes 420.

Figure 5:
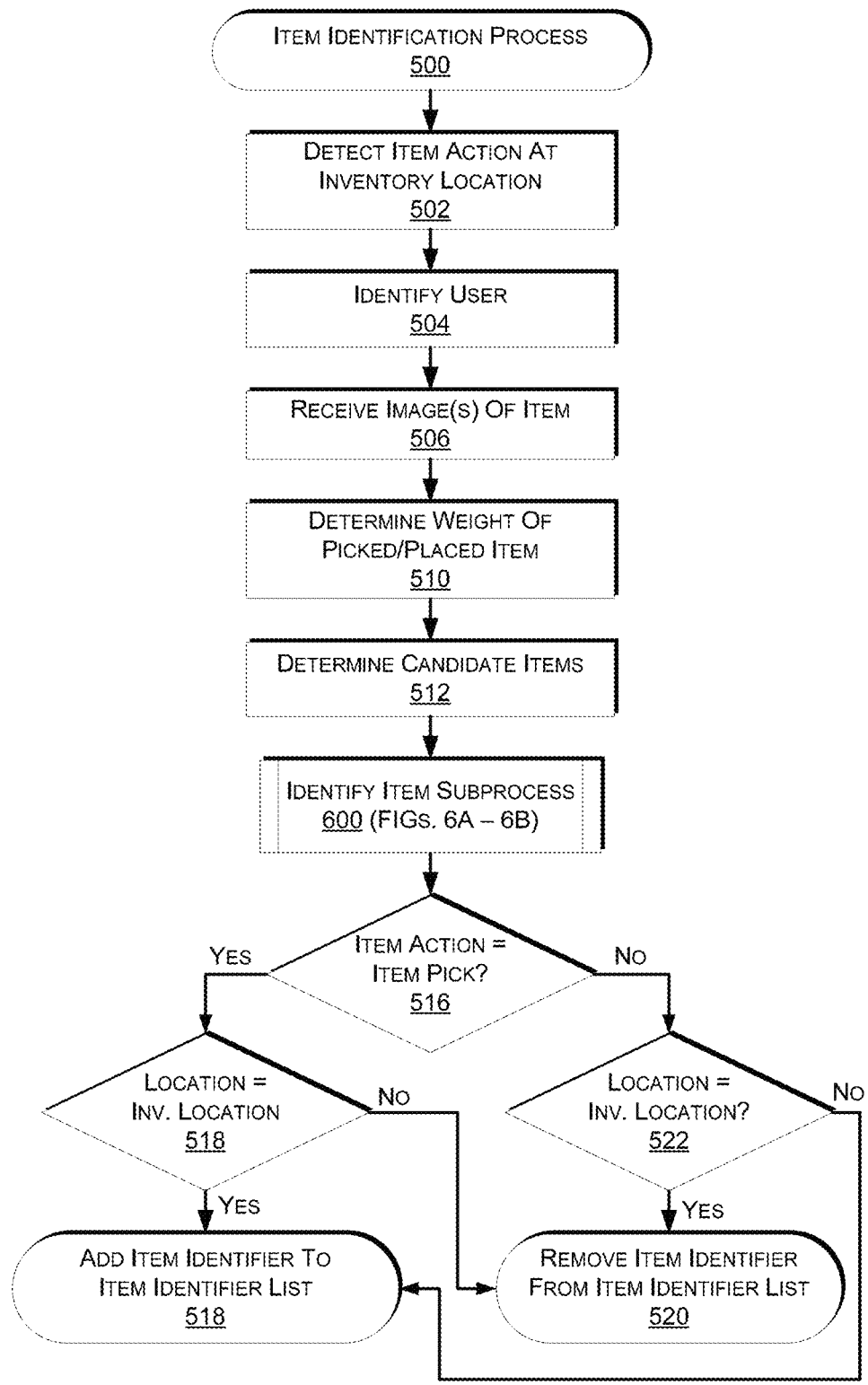
FIG. 5 depicts a flow diagram of an example item identification process, according to some implementations.

FIG. 5 depicts a flow diagram of an example item identification process 500 for identifying an item that is picked or placed at a location, according to some implementations. The process of FIG. 5 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins by detecting an item action at a location, as in 502. An item action may be, for example, a pick of an item or a place of the item at the location. The location may be, for example, an inventory location (e.g., a shelf or bin within an inventory location), a tote, or any other location within the materials handling facility. An item action is detected when a weight change at the location is determined. For example, the weight determining element at the location will detect a change in weight resulting from a pick or place of an item at the location. The detected item action corresponds to the detected weight change. For example, if the weight change is a decrease in weight at the location, the item action is a pick of an item from the location. If the weight change is an increase in weight at the location, the item action is a place of an item at the location.

Upon detecting an item action, the user that caused the item action is identified, as in 504. As discussed above, there are various techniques for identifying the user. For example, the user may be identified when they arrive at the materials handling facility (e.g., biometrics, user identifier, image recognition) and a user pattern created and associated with the user. The user pattern may be monitored and used to track the user as the user navigates through the materials handling facility. Alternatively, or in addition thereto, the user may be identified at the location where the item action is detected. For example, an active tag and/or visual tag associated with the user may be detected near the location and used to identify the user. An image of the user at the location may be captured and processed to identify the user. Other user identification techniques may also be used at the location to identify the user that caused the action.

In addition to identifying the user, one or more images of the item associated with the item action are captured at the location and received by the inventory management system, as in 506. For example, one or more image capture devices at the location may capture an image of the item as it is picked or placed at the location and provide the image to the inventory management system for processing. Alternatively, for a picked item, an image may have been previously captured that included the item at the location prior to the pick. Upon detecting the pick at the location, the previously captured image of the item may be provided to the inventory management system. Likewise, for a placed item, an image of a placed item may be captured after the item is placed at the location and provided to the inventory management system.

The weight of the item associated with the item action may also be determined, as in 510. As discussed above, the weight of the item may be determined based on a detected weight change at the location. For example, if an item is placed at a location, the weight of inventory at the location, as determined by a weight determining element at the location, will increase. The increase in weight is representative of the weight of the placed item. Likewise, if an item is picked from a location, the weight determining element at the location will determine a decrease in inventory weight. The decrease in inventory weight is representative of the weight of the picked item.

Based on the determined weight of the item associated with the item action, candidate items having a similar weight are identified, as in 512. Candidate items are items that are similar in weight to the item associated with the item action. In some implementations, items may be assigned a weight class, the weight class representing a range of weights. The weight class corresponding to the weight of the item associated with the item action may be identified and all items associated with the weight class determined to be candidate items.

In some implementations, rather than determining candidate items based on a weight class, the example process 500 may identify a defined number of items that have a weight similar to the weight of the item associated with the item action. For example, all items having a weight that is plus or minus 20 grams (or any other amount) of the weight of the item associated with the item action may be identified as candidate items. In still another example, the example process may identify candidate items as a defined number of items having a weight similar to the determined weight of the item associated with the item action. For example, candidate items may be defined as the 10 items having a weight that is closest to the determined weight of the item associated with the item action.

In addition to utilizing weight to identify candidate items, the location at which the item action occurred may also be used to identify candidate items. For example, if the location is an inventory location, the example process 500 may identify candidate items as items associated with the inventory location and having a weight that is similar to that of the determined weight of the item associated with the item action. Likewise, if the location is a tote of a user, the example process 500 may identify the candidate items as items identified in the item identifier list associated with the user and that have a weight similar to the determined weight of the item associated with the item action.

Utilizing weight and/or location to determine candidate items for use in processing an image of the item associated with the item action reduces the processing time and increases the accuracy in identifying the item associated with the item action. For example, a materials handling facility may maintain inventory of hundreds of thousands of items. Rather than having to compare the image of the item associated with the item action with all of the inventory items, by utilizing weight and/or location information, the list of candidate items can be greatly reduced before any image processing occurs.

Reducing the candidate items to those within a weight range is also beneficial when adding a new item to inventory within a materials handling facility and generating item information that is stored for that item. For example, when generating item image information for the item that is maintained in the inventory data store, the item only needs to be compared to other items having a similar weight, rather than all inventory items maintained in the materials handling facility.

Returning to FIG. 5, utilizing the candidate items, the identify item subprocess 600 is performed to process the image of the item and identify the item associated with the item action. The identify item subprocess 600 is discussed in further detail below with respect to FIGS. 6A-6B. The identify item subprocess 600 returns an identification of the item associated with the item action.

A determination is also made as to whether the item action is a pick of the item from the location or a place of the item at the location, as in 516. If the item action is a pick, a determination is made as to whether the location of the pick is an inventory location or a tote, as in 518. If the location is an inventory location, an item identifier representative of the item is added to the item identifier list associated with the user that picked the item from the location, as in 519. If the location is a tote, an item identifier representative of the item is removed from the item identifier list associated with the user that picked the item from the tote, as in 520.

If it is determined at decision block 516 that the item action was a place of the item at the location, a determination is made as to whether the location is an inventory location or a tote, as in 522. If it is determined that the location is an inventory location, an item identifier representative of the item placed at the inventory location is removed from the item identifier list associated with the user, as in 520. However, if it is determined that the location is a tote, an item identifier representative of the item that was placed into the tote is added to the item identifier list associated with the user that placed the item into the tote, as in 518.

Figure 6A:
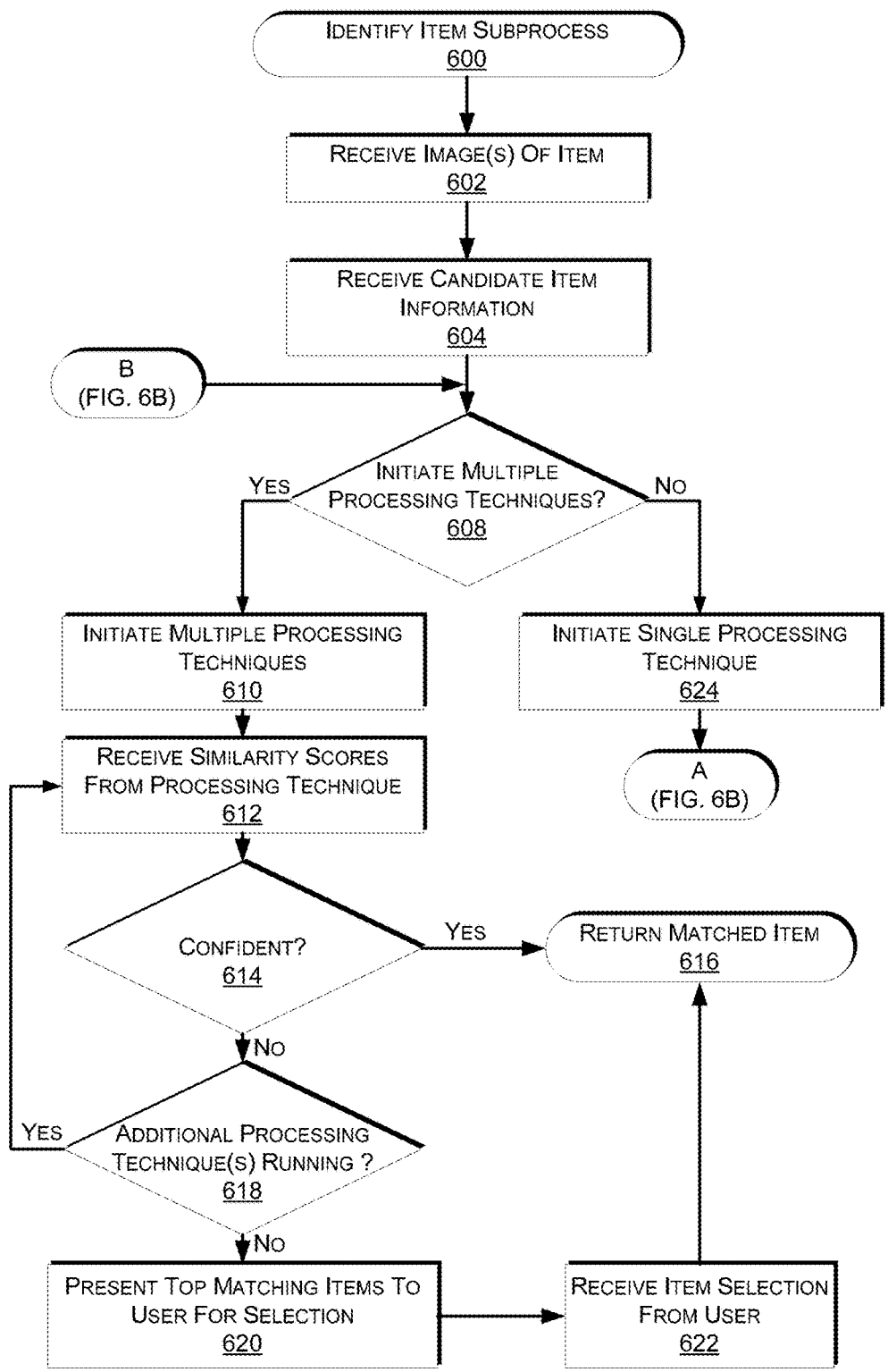
FIGS. 6A-6B depict a flow diagram of an example identify item subprocess, according to some implementations.
Figure 6B:
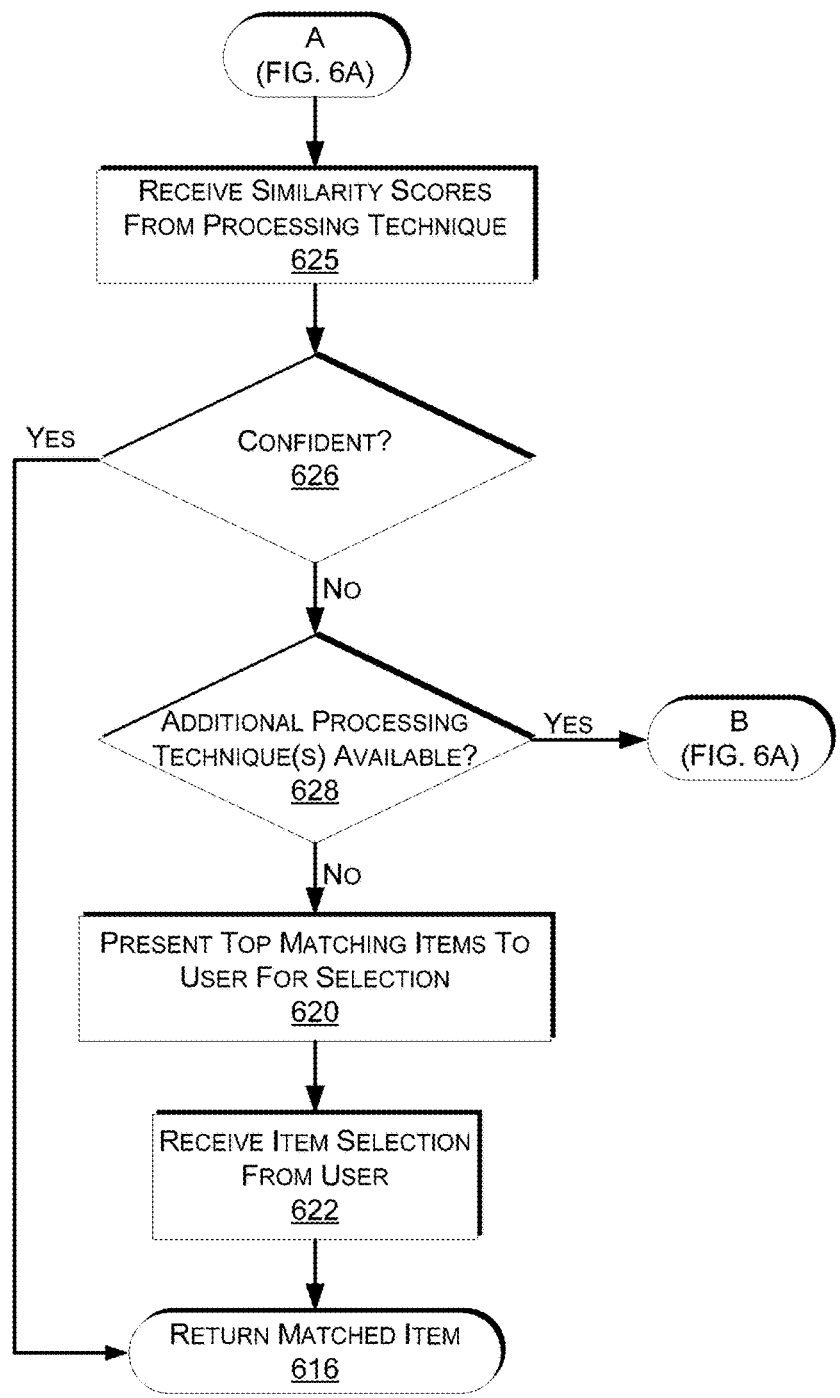

FIGS. 6A-6B depict a flow diagram of an example identify item subprocess 600, according to some implementations. The example subprocess 600 begins by receiving, from the example process 500, images of the item associated with the item action, as in 602. Likewise, candidate information is also obtained, as in 604. For example, the example subprocess 600 may receive a list of candidate items from the example process 500 and obtain stored item image information associated with each of the identified candidate items from an inventory data store.

At decision block 608, a determination may be made as to whether multiple processing techniques are to be performed. As discussed above, in some implementations, multiple processing techniques, such as IM, CFS, HMP, and/or DL may be initiated at approximately the same time. In other implementations, only one of the processing techniques may be initially initiated. For example, if the item to be identified (the item associated with the item action) is likely of a particular category (e.g., based on size, shape, location, weight class), one of the processing techniques may be determined to yield better similarity results, and as such that processing technique may be initiated first. For example, it may be determined that HMP typically yields the best result for items associated with weight class Class 2. In such an example, rather than initiating all of the processing techniques, the example subprocess 600 may only initiate HMP. Alternatively, the preferred processing technique and any that are more costly (take longer to complete) may also be initiated. In this example, HMP and DL may be initiated at approximately the same time.

If it is determined that multiple processing techniques are to be initiated, at block 610 each of the processing techniques are initiated at approximately the same time. For example, each of IM, CFS, HMP and DL may all be initiated at approximately the same time. Each of the processing techniques process the received item to generate item information. The item information is then compared with stored item image information to produce similarity scores identifying how similar the item information for the item is to stored item image information. This comparison is performed for each candidate item and the similarity score for each candidate item is returned.

Because the processing techniques each take different amounts of time to complete, the cheapest processing technique (the one that takes the least amount of time to perform) will complete and the example subprocess 600 will receive a result from that processing technique identifying the similarity scores for the candidate items, as in 612. When the results of a processing technique are received, a determination is made as to a high degree of confidence exists that the item associated with the item action has been identified, as in 614. Determining confidence may be done in a variety of manners. For example, a ratio between the highest similarity scores may be determined and if the ratio exceeds a defined ratio, it may be determined that a high degree of confidence exists that the item associated with the item action has been identified. To illustrate, if the processing technique returns a similarity score of 95% for the highest ranked stored item image information and a similarity score of 20% for the second highest ranked stored item image information, the ratio of the two similarity scores may be sufficient that there is a high degree of confidence that the item associated with the stored item image information having the highest similarity score is representative of the item associated with the item action. In contrast, if the processing technique returns a similarity score of 95% for the highest ranked stored item image information and a similarity score of 93% for the second highest ranked stored item image information, it may be determined that the ratio between the two is not enough to be confident that the highest ranked stored item image information is representative of the item associated with the item action.

In another implementation, a difference between the highest similarity score and the second highest similarity score may be determined and if the difference between the two similarity scores is large enough it may be determined that enough confidence exists to determine that the stored item image information with the highest similarity score is representative of the item associated with the item action.

In another implementation, a determination may be made as to whether the highest similarity score exceeds a threshold. The threshold may be any defined amount that must be exceeded before a candidate item is selected as the identity of the item associated with the item action. The threshold may be different for different items, may vary over time and/or may be different for different users.

In still other implementations, a combination of techniques (e.g., ratio and threshold) may be combined to determine if enough confidence exists to determine that the item with the highest similarity score is the item.

In some implementations, the similarity scores received from each processing technique may be considered independently. In other implementations, the similarity scores for the same candidate item received from different processing techniques may be combined or aggregated prior to comparing with the threshold. For example, if IM identifies Item A as having the highest similarity score but the similarity score does not exceed the threshold, the similarity score returned from CFS for item A may be combined with the similarity score from IM and then compared to the threshold. The combination may be, for example, a weighted sum of the different similarity scores, an average between the different similarity scores, and/or another mathematical combination of similarity scores.

If it is determined that the confidence level is sufficient, the identity of the candidate item with the highest similarity score is returned as the identity of the item associated with the item action, as in 616. In addition to returning the identity of the candidate item, in some implementations, any processing techniques that are still running may be terminated as the item identity has been determined. In other implementations, the example subprocess 600 may continue, completing each processing technique to further confirm that the item was correctly identified. In still other implementations, the remaining processing techniques may be instructed to only continue with a comparison of the items having the top similarity scores returned from the completed processing technique. For example, if IM identifies Item A, Item B, and Item C as having the top similarity scores, the remaining processing techniques that are still running may be instructed to only consider Item A, Item B, and Item C.

If it is determined at decision block 614 that the confidence level is not sufficient, a determination is made as to whether additional processing techniques are still running for which results have not yet been received, as in 618. If additional processing techniques are still running, the example subprocess 600 returns to block 612 and continues. In some implementations, the example subprocess 600 may allow each of the still running processing techniques to complete with respect to all candidate items. In other implementations, the example subprocess 600 may identify one or more candidate items having the highest similarity scores returned from the completed processing technique and reduce the remaining processing techniques to only consider those top candidate items. For example, IM may identify Item A, Item B, and Item C out of fifty candidate items as having the highest similarity scores. The example subprocess 600 may instruct the remaining processing techniques to only consider Item A, Item B, and Item C, thereby reducing the time needed to complete the additional processing techniques.

If it is determined that no processing techniques remain, the candidate items having the highest similarity score are identified and presented to the user for selection, as in 620. For example, the subprocess 600 may identify the top three candidate items to a user for selection. For example, representations and/or information identifying the top candidate items may be presented to the user via a display or portable device and the user may be asked to select the item associated with the item action. Upon user selection, the example subprocess 600 receives the user selection, as in 622, and returns the identification of the selected item as the item associated with the item action, as in 616.

Returning to decision block 608, if it is determined that only a single processing technique is to be initiated, the single processing technique is initiated, as in 624. Turning now to FIG. 6B, the initiated processing technique will complete and return a similarity score for each of the candidate items considered, as in 625. Similar to the above, the example subprocess 600 it will be determined whether sufficient confidence exists to identify the item, as in 626. The confidence level may be sufficient, if, for example, the ratio between the highest similarity score and the second highest similarity score are sufficiently different or above a defined amount. Other techniques for determining confidence, such as those discussed above (e.g., threshold, difference), may also be used, alone or in combination, to determine if a sufficient level of confidence exists to identify the item.

If it is determined that the confidence level is sufficient, the example returns to block 616 and returns the identity of the candidate item having the highest similarity score as the identity of the item associated with the item action. If it is determined that the confidence level is not sufficient, a determination is made as to whether there are additional processing techniques available that have not yet been initiated, as in 628. In some implementations, the example subprocess 600 may only consider whether any more complex processing techniques are available. For example, if the single processing technique initiated was CFS, the example subprocess may only consider whether HMP and/or DL have completed, because IM is a simpler processing technique. In other implementations, the example subprocess 600 may consider whether any processing techniques remain.

If additional processing techniques remain, the example subprocess 600 returns to decision block 608 (FIG. 6A) and continues. However, if it is determined that no additional processing techniques are available, the example subprocess 600 returns to block 620 and continues.

Reducing the candidate items down to just those that have a similar weight as the item to be identified (or within a same weight class) both reduces processing time and increases accuracy. For example, Table 1 below illustrates the accuracy, using different processing techniques, for identifying the item that the user has picked from their tote and placed at the inventory location, when the candidate items include all 1,000 potential items. Specifically, Table 1 shows the accuracy in correctly identifying the item (Top 1) and the accuracy of correctly identifying the item as one of the top 3 (Top 3) using a weight only algorithm (Weight Only), image processing algorithms (Vision Only), and weight and image processing algorithms combined (Weight+Vision).

TABLE 1

| Algorithm | Top 1 | Top 3 |
|---|---|---|
| Weight Only | 3.87% | 16.41% |
| Vision Only | 91.24% | 94.60% |
| Weight + Vision | 94.62% | 97.98% |

Table 2, below, show the accuracy in correctly identifying the item when the number of candidate items is reduced to only consider the 25 items that are currently located in the user's tote. Similar to Table 1, Table 2 shows the accuracy in correctly identifying the item (Top 1) and the accuracy of correctly identifying the item as one of the top 3 (Top 3) using a weight only algorithm (Weight Only), image processing algorithms (Vision Only), and weight and vision algorithms combined (Weight+Vision).

TABLE 2

| Algorithm | Top 1 | Top 3 |
|---|---|---|
| Weight Only | 77.17% | 99.08% |
| Vision Only | 98.98% | 99.44% |
| Weight + Vision | 99.57% | 99.99% |

The results illustrated in Table 1 and Table 2 were based on approximately 9,000 test cases. When using the vision algorithms, multiple processing techniques were initiated at the same time as discussed above with respect to FIGS. 6A-6B. Approximately, 80.5% of the items were identified using DL, 0.5% were identified using HMP, and the remaining 19% were identified using IM. For each item, a weight variation of 6% was utilized.

As illustrated in Table 1, when attempting to identify a single item from all 1,000 candidate items based on weight alone, the accuracy is only 3.87%. For the top three items, the accuracy using only a weight algorithm is 16.41%. When using only an image processing algorithm, the accuracy in correctly identifying the item from all 1,000 candidate items increases to 91.24%, however this is a very computationally intensive process. By reducing the list of 1,000 candidate items to only those having a weight that is similar to the item to be identified (or in the same weight class), the accuracy of identifying the item increases to 94.62% and the accuracy in identifying the item as one of the top 3 items increases to 97.98%. In addition to increasing the accuracy of identification, by reducing the candidate items to only those having a similar weight greatly reduces the computation time and resources required by the image processing algorithms.

Table 2 illustrates the accuracy when only initially considering the 25 items in the user's tote when the item is picked from the tote and placed at the inventory location. As shown, when only considering a small set of candidate items, the accuracy of each identification technique increases. For example, when using weight alone to identify the item from among the 25 candidate items, the accuracy increases to 77.17% and the accuracy of identifying the top three items increases to 99.08%. Similar increases in accuracy are also illustrated when identifying the item using only image processing algorithms and using a combination of weight and image processing algorithms. For example, using both weight algorithms and image processing algorithms and only considering the 25 items in the users cart results in the item being accurately identified 99.57% and the accuracy in identifying the item as one of the top three items is 99.99%.

Figure 7:
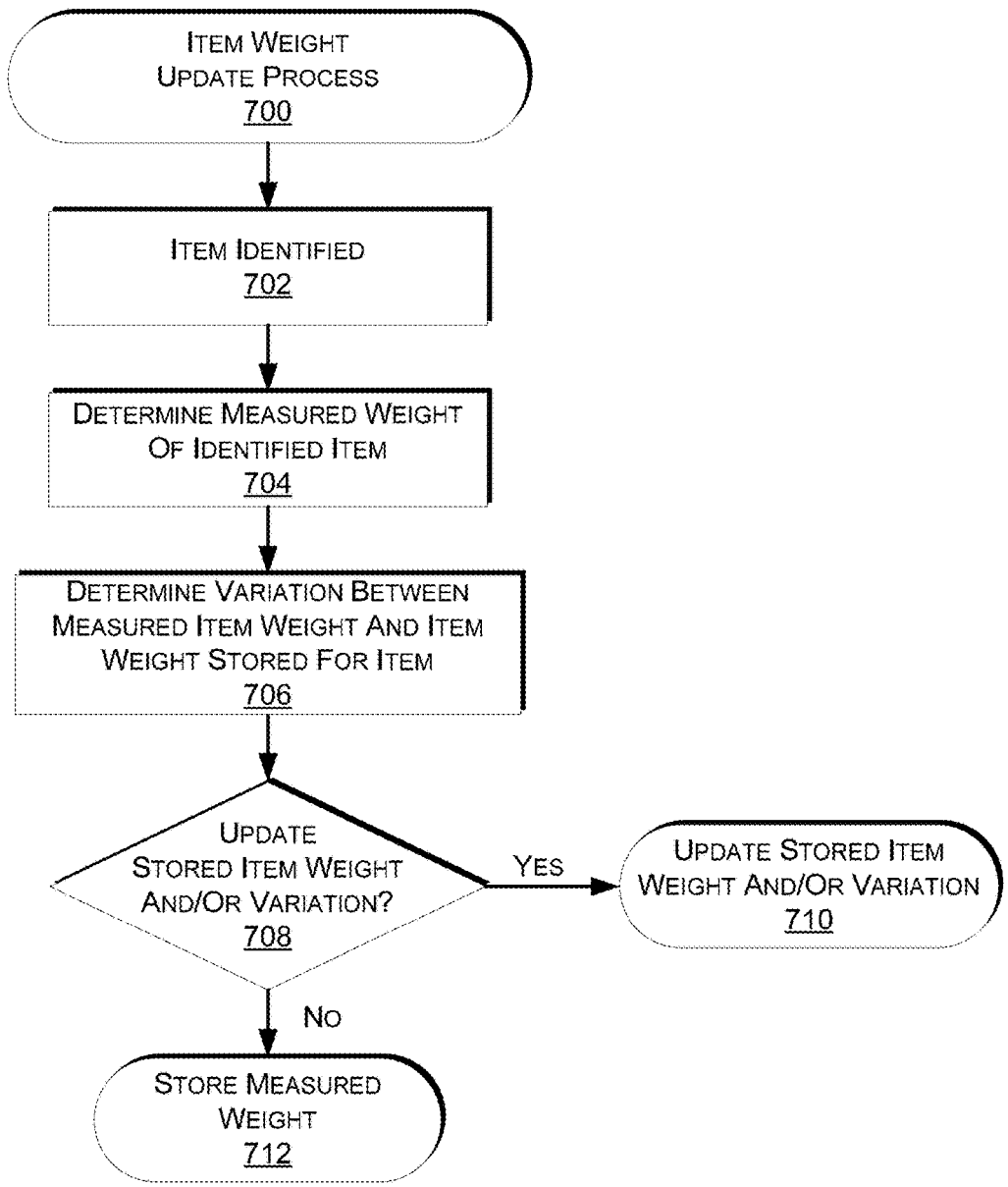
FIG. 7 depicts a flow diagram of an example item weight variation process 700, according to some implementations.

FIG. 7 depicts a flow diagram of an example item weight update process 700, according to some implementations. The example process 700 begins when an item is identified using the techniques discussed above, as in 702. When an item is identified, the weight of the actual item as measured by the weight determining element at the location at which the item was picked or placed is determined, as in 704. Based on the actual measured weight of the item, a variation of the measured item weight and the weight stored for the item is determined, as in 706. As discussed above, a weight may be associated with an item and maintained in the inventory data store for the item. In some implementations, the item weight may be the mean or medium of actual weight measurements for the item. Alternatively, the stored weight for the item may be a weight provided by the manufacturer and/or supplier of the item, a weight entered by an agent, etc.

Based on the determined variation, a determination is made as to whether the stored item weight and/or the weight variation associated with the stored item image information are to be updated, as in 708. In some implementations, the stored item weight may be updated with each actual weight measurement of the item. For example, if the stored item weight is an average of measured item weights, each time a weight is measured for the item the stored item weight may be updated to include that measured weight in the average. Likewise, any time the measured weight of the item is outside of the variation, the stored weight variation may be updated. Alternatively, the variation may be based on a standard deviation of measured weights for the item and the variation may be updated if the standard deviation changes based on the measured weight.

If it is determined that the stored item weight and/or weight variation are to be updated, the example process updates the stored item weight and/or weight variation, as in 710. If it is determined that the stored item weight and/or the stored weight variation are not to be updated, the example process 800 completes and the measured weight for the item may be stored, as in 712.

Figure 8:
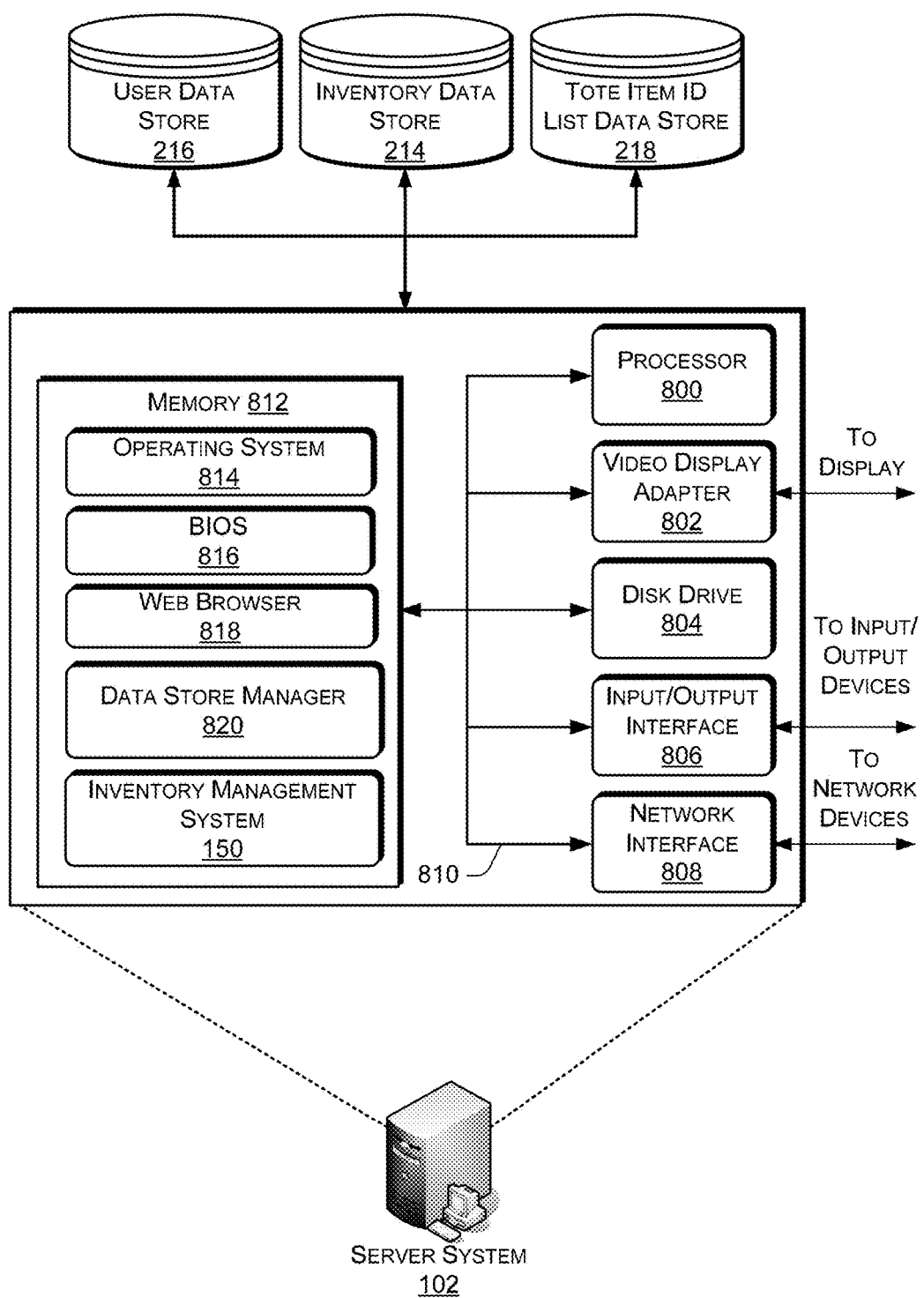
FIG. 8 is a block diagram of an illustrative implementation of a server system that may be used with various implementations.

FIG. 8 is a pictorial diagram of an illustrative implementation of a server system, such as the server system 102, that may be used in the implementations described herein. The server system 102 may include a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 102 to monitor and configure operation of the server system 102. The input/output interface 806 likewise communicates with external input/output devices not shown in FIG. 8, such as a mouse, keyboard, scanner, or other input and output devices that can be operated by an operator of the server system 102. The network interface 808 includes hardware, software, or any combination thereof, to communicate with other computing devices. For example, the network interface 808 may be configured to provide communications between the server system 102 and other computing devices, such as a tote, via the network 206, as shown in FIG. 2.

The memory 812 generally comprises random access memory (RAM), read-only memory (ROM), flash memory, and/or other volatile or permanent memory. The memory 812 is shown storing an operating system 814 for controlling the operation of the server system 102. A binary input/output system (BIOS) 816 for controlling the low-level operation of the server system 102 is also stored in the memory 812.

The memory 812 additionally stores program code and data for providing network services to totes, weight determining elements and/or the inventory management system 150. Accordingly, the memory 812 may store a browser application 818. The browser application 818 comprises computer executable instructions that, when executed by the processor 800, generate or otherwise obtain configurable markup documents such as Web pages. The browser application 818 communicates with a data store manager application 820 to facilitate data exchange between the inventory data store 214, the user data store 216, and/or the item identifier list data store 218.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 214-218 as needed to execute aspects of one or more applications for the tote 202, and/or the inventory management system 150.

The data stores 214-218 can include several separate data tables, databases or other data storage mechanisms and media for storing data relating to a particular aspect. For example, the data stores 214-218 illustrated include mechanisms for inventory information, user information, item identifier lists, tote information, weight information, weight variation information, item locations, weight determining elements information, etc., which can be used to generate and deliver information to the inventory management system 150 and/or users.

It should be understood that there can be many other aspects that may be stored in the data stores 214-218. The data stores 214-218 are operable, through logic associated therewith, to receive instructions from the server system 102 and obtain, update or otherwise process data in response thereto.

In addition to maintaining information about inventory, users, and user patterns, the inventory management system 150 may provide use information back to the users. For example, the inventory management system 150, through communication with the server system 102, may provide use information back to a user. Such information may include a list of the items associated with the user pattern, the cost of items associated with the user pattern, items remaining to be picked before progressing to the transition area, the location within the materials handling facility of items to be picked, and the like.

The memory 812 may also include the inventory management system 150, discussed above. The inventory management system 150 may be executable by the processor 800 to implement one or more of the functions of the server system 102. In one implementation, the inventory management system 150 may represent instructions embodied in one or more software programs stored in the memory 812. In another implementation, the inventory management system 150 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An item identification system, comprising:
    determining an item pick of a first item from an inventory location;
    receiving an image that includes a representation of the first item;
    determining a plurality of candidate items, each of the plurality of candidate items having corresponding candidate item information;
    determining that a plurality of processing techniques are to be performed to identify the first item represented in the received image;
    initiating each of the plurality of processing techniques, wherein each of the plurality of processing techniques determine a similarity score between first item image information that is representative of the image and at least one of the plurality of candidate item information;
    determining a first similarity score using a first processing technique of the plurality of processing techniques, wherein the first similarity score is representative of a similarity between the first item image information and a first candidate item information of the plurality of candidate items;
    receiving a second similarity score from the first processing technique of the plurality of processing techniques, wherein the second similarity score is representative of a second similarity between the first item image information and a second candidate item information of the plurality of candidate items;
    determining that a ratio between the first similarity score and the second similarity score does not exceed a defined amount;
    receiving a third similarity score from a second processing technique of the plurality of processing techniques, wherein the third similarity score is representative of a third similarity between the first item image information and the first candidate item information;
    receiving a fourth similarity score from the second processing technique of the plurality of processing techniques, wherein the fourth similarity score is representative of a fourth similarity between the first item image information and the second candidate item information;
    determining that a second ratio between the third similarity score and the second similarity score exceeds a second defined amount;
    identifying, based at least in part on determining that the second ratio exceeds the second defined amount, the first item as the candidate item associated with the first candidate item information; and
    in response to identifying the first item as the candidate item, updating an item identifier list associated with a user that picked the first item from the inventory location to include an item identifier representative of the first item.

2. The item identification system of claim 1, wherein at least one of the plurality of processing techniques is at least one of an image matching algorithm, an edge detection algorithm, an object detection algorithm, a common feature suppression algorithm, a hierarchical matching pursuit algorithm, or a deep learning algorithm.

3. The item identification system of claim 1, wherein:
    each of the plurality of processing techniques are initiated at approximately a same time;
    and the first processing technique completes prior to the second processing technique.

4. The item identification system of claim 1, wherein the first defined amount and the second defined amount are a same amount.

5. The item identification system of claim 1, wherein the first similarity score and the second similarity score are combined.

6. A computer-implemented method for identifying an item, comprising:
    under control of one or more computing systems configured with executable instructions,
        receiving an image of a first item, wherein the first item is associated with an item action;
        determining a plurality of candidate items potentially matching the first item associated with the item action,
        obtaining from a data store, stored item image information for each of the plurality of candidate items;
        determining that a plurality of processing techniques are to be performed to identify the first item associated with the item action;
        in response to determining that a plurality of processing techniques are to be performed, initiating a first processing technique and a second processing technique;
        receiving a first result from the first processing technique, the first result indicating a highest similarity score for a candidate item of the plurality of candidate items as determined by the first processing technique, the highest similarity score for the candidate item as determined by the first processing technique is determined based at least in part on a processing by the first processing technique of a first item image information representative of the image and the stored item image information associated with at least one of the plurality of candidate items;
        determining based at least in part on the first result that a confidence level has not been achieved to confirm that the candidate item corresponds to the item;
        receiving a second result from the second processing technique, the second result indicating a highest similarity score for the candidate item as determined by the second processing technique, the highest similarity score for the candidate item as determined by the second processing technique is determined based at least in part on the first item image information and the stored item image information associated with at least one of the plurality of candidate items;
        determining based at least in part on the first result and the second result that the confidence level has been achieved;
        identifying the candidate item as the item; and
        in response to identifying the candidate item as the item, updating an item identifier list to either include an item identifier representative of the candidate item or exclude the item identifier from the item identifier list.

7. The computer-implemented method of claim 6, wherein:
the first processing technique and the second processing technique initiate at approximately a same time; and
the second processing technique completes after the first processing technique.

8. The computer-implemented method of claim 6, further comprising:
in response to determining based at least in part on the first result that the confidence level has not been achieved, instructing the second processing technique to process a sub-plurality of the plurality of candidate items based at least in part on the first result from the first processing technique.

9. The computer-implemented method of claim 6, wherein the second processing technique does not process each of the plurality of candidate items.

10. The computer-implemented method of claim 6, wherein identifying the candidate item as the item includes:
determining that the highest similarity score for the candidate item as determined by the second processing technique exceeds a threshold.

11. The computer-implemented method of claim 6, further comprising:
initiating a third processing technique at approximately a same time as the first processing technique and the second processing technique, wherein at least two of the first processing technique, second processing technique, and third processing technique require a different amount of time to complete; and
terminating the third processing technique based at least in part on at least one of the first result or the second result.

12. The computer-implemented method of claim 6, wherein the first processing technique is a preferred processing technique selected based at least in part on an item category and a past result from the processing technique exceeding a threshold when processing information for an item associated with the item category.

13. A computing system, comprising:
one or more processors; and
a memory coupled to the one or more processors and storing program instructions that when executed by the one or more processors cause the one or more processors to at least:
determine an item place of a first item at a location;
receive a first image that includes a representation of the first item;
determine a plurality of candidate items, each candidate item associated with representative stored item image information, wherein the plurality of candidate items are selected based at least in part on one or more of a weight of the first item or the location;
initiate at least a first processing technique and a second processing technique, wherein:
the first processing technique is configured to at least process the first image and compare first image information with the respective stored item image information associated with each candidate item of the plurality of candidate items; and
the second processing technique is configured to at least process the first image and compare first image information with the respective stored item image information associated with each candidate item of the plurality of candidate items; and
receive a first result from the first processing technique identifying a first candidate item having a first highest similarity score as determined by the first processing technique;
determine that a first confidence level of the first candidate item is not sufficient to identify the first candidate item as the first item represented in the first image;
receive a second result from the second processing technique identifying a second candidate item having a second highest similarity score as determined by the second processing technique;
determine that a second confidence level of at least one of the second highest similarity score as determined by the second processing technique or a combined similarity score representative of a combination of the first highest similarity score and the second highest similarity score is sufficient;
identify the first item as the candidate item associated with either the second highest similarity score as determined by the second processing technique or the combined similarity score; and
in response to identifying the first item as the candidate item, update an item identifier list associated with a user that placed the item at the location to remove an item identifier representative of the first item from the item identifier list.

14. The computing system of claim 13, wherein the weight of the first item is determined based at least in part on a change in an inventory weight detected at the location.

15. The computing system of claim 13, wherein the program instructions that cause the one or more processors to identify the first item further include instructions that cause the one or more processors to at least:
determine that the second highest similarity score, as determined by the second processing technique, exceeds a threshold; and
identify the first item as associated with stored item image information having the second highest similarity score as determined by the second processing technique.

16. The computing system of claim 13, wherein the program instructions that cause the one or more processors to identify the first item further include instructions that cause the one or more processors to at least:
determine that a second similarity score as determined by the second processing technique or the combined similarity score does not exceed a threshold; and
present to the user at least two representations of items; and
identify the first item as an item associated with a representation selected by the user.

17. The computing system of claim 13, wherein the first image of the first item is received in response to the place of the first item at the location.

18. The computing system of claim 13, wherein the program instructions that when executed by the one or more processors cause the one or processors to at least:
initiate the second processing technique to process the first image and compare first image information with respective stored item image information associated with each candidate item of the plurality of candidate items, wherein the second processing technique is initiated at approximately a same time as the first processing technique.

19. The computer-implemented method of claim 6, wherein the first processing technique is at least one of an image matching ("IM") algorithm, an edge detection algorithm, an object detection algorithm, a common feature suppression ("CFS") algorithm, a hierarchical matching pursuit ("HMP") algorithm, or a deep learning ("DL") algorithm.

20. A method to determine an item represented in an image, comprising:
   initiating processing of the image by each of at least a first processing technique, a second processing technique, and a third processing technique;
   receiving, at a first time, a first result from the first processing technique indicating a first candidate item as determined by the first processing technique;
   determining that a first confidence level of the first candidate item is not sufficient to identify the first candidate item as the item;
   receiving, at a second time that is subsequent to the first time, a second result from the second processing technique indicating the first candidate item as determined by the second processing technique;
   determining that a second confidence level corresponding to at least one of the second processing technique or a combination of the first processing technique and the second processing technique is sufficient to identify the first candidate item as the item;
   based at least in part on determining that the second confidence level corresponding to at least one of the second processing technique or the combination of the first processing technique and the second processing technique is sufficient to identify the first candidate item as the item:
      identifying the item as the first candidate item; and
      terminating the third processing technique prior to a completion of the third processing technique.

21. The method of claim 20, further comprising:
   detecting an item action at an inventory location; and
   receiving the image from a camera oriented toward the inventory location.

22. The method of claim 20, further comprising:
   determining that the item was picked from an inventory location; and
   in response to identifying the item as the first candidate item, updating a list to include an indication of the first candidate item.

* * * * *